United States Patent [19]

Jozefczak

[11] Patent Number: 4,700,980

[45] Date of Patent: Oct. 20, 1987

[54] WIND DEFLECTOR FOR VEHICLE SIDE WINDOW

[75] Inventor: Thadius F. Jozefczak, Warren, Mich.

[73] Assignee: General Motors Corporation, Detroit, Mich.

[21] Appl. No.: 931,233

[22] Filed: Nov. 17, 1986

[51] Int. Cl.$^4$ .............................................. B62D 35/00
[52] U.S. Cl. ...................................... 296/1 S; 296/154
[58] Field of Search .................. 296/1 S, 154; 98/2.12

[56] References Cited

U.S. PATENT DOCUMENTS

| | | | |
|---|---|---|---|
| 2,141,442 | 12/1938 | Mead et al. | 296/154 |
| 2,583,759 | 1/1952 | Williams et al. | 296/154 |
| 2,698,052 | 12/1954 | Warner | 296/154 |

Primary Examiner—Robert R. Song
Attorney, Agent, or Firm—Charles E. Leahy

[57] ABSTRACT

A wind deflector for swing-out side windows in a van includes first and second generally rectangular clear plastic deflector panels which overlie one another. The inner panel is attached to the leading edge of the window pane and extends forwardly therefrom. The outer panel is attached to the vehicle body along a vertical line forward of the forward edge of the window opening and extends rearwardly therefrom to overlie the inner panel. When the window is closed, the panels overlie one another in closely spaced streamlining relation with the side of the vehicle body. When the window is open, the outward swinging movement of the bottom of the window causes the panels to flex one another so that the panels continue to overlie one another and bridge the gap between the leading edge of the window pane and the vehicle body to streamline and deflect the oncoming airflow.

3 Claims, 4 Drawing Figures

WIND DEFLECTOR FOR VEHICLE SIDE WINDOW

The invention relates to a wind deflector for the swing-out side windows in van type motor vehicles.

BACKGROUND OF THE INVENTION

Many motor vehicles, particularly passenger vans, employ side windows of the type in which a rectangular window pane is mounted within a rectangular window opening by a pair of hinges connecting the top of the window pane with the top of the window opening, and a toggle mechanism acting between the bottom of the window pane and the bottom of the window opening to either clamp the window in a closed position flush with the vehicle body or to swing the bottom of the window pane outwardly to an open position. When the window pane is pivoted outwardly to the open position, the leading edge of the window pane is spaced away from the forward edge of the window opening by a gap which is progressively wider from the top to the bottom of the window.

A shortcoming of the aforedescribed window arrangement is that the outward projection of the window pane interrupts the streamlined airflow over the side of the vehicle body and increases the level of noise within the passenger compartment. Accordingly, it would be desirable to provide a wind deflector for streamlining the vehicle body when the window is in the open position.

SUMMARY OF THE INVENTION

According to the invention, first and second generally rectangular clear plastic deflector panels overlie one another with the inner panel attached to the leading edge of the window pane and extending forwardly therefrom. The outer panel is attached to the vehicle body along a vertical line forward of the forward edge of the window opening and extending rearwardly therefrom to overlie the inner panel. When the window is closed, the panels overlie one another in closely spaced streamlining relation with the side of the vehicle body. When the window is open, the outward swinging movement of the bottom of the window causes the panels to flex one another so that the panels continue to overlie one another and bridge the gap between the leading edge of the window pane and the vehicle body to streamline and deflect the oncoming airflow. The rectangular panels are preferably comprised of a mounting portion and a deflecting portion which are connected by a plastic living hinge. The mounting portion is attached to either the vehicle body or the leading edge of the window, as the case may be. The living hinge functions to bias the inner and outer panels to their normal positions closely overlying the side wall of the vehicle body.

Accordingly, the object, feature and advantage of the invention resides in the provision of overlying yieldable plastic panels overlying one another and attached respectively to the leading edge of the window and the vehicle body forward of the window so that the panels bridge the gap between the window pane and the vehicle body to streamline and deflect the oncoming airflow.

DESCRIPTION OF THE PREFERRED EMBODIMENT

Figure 1:
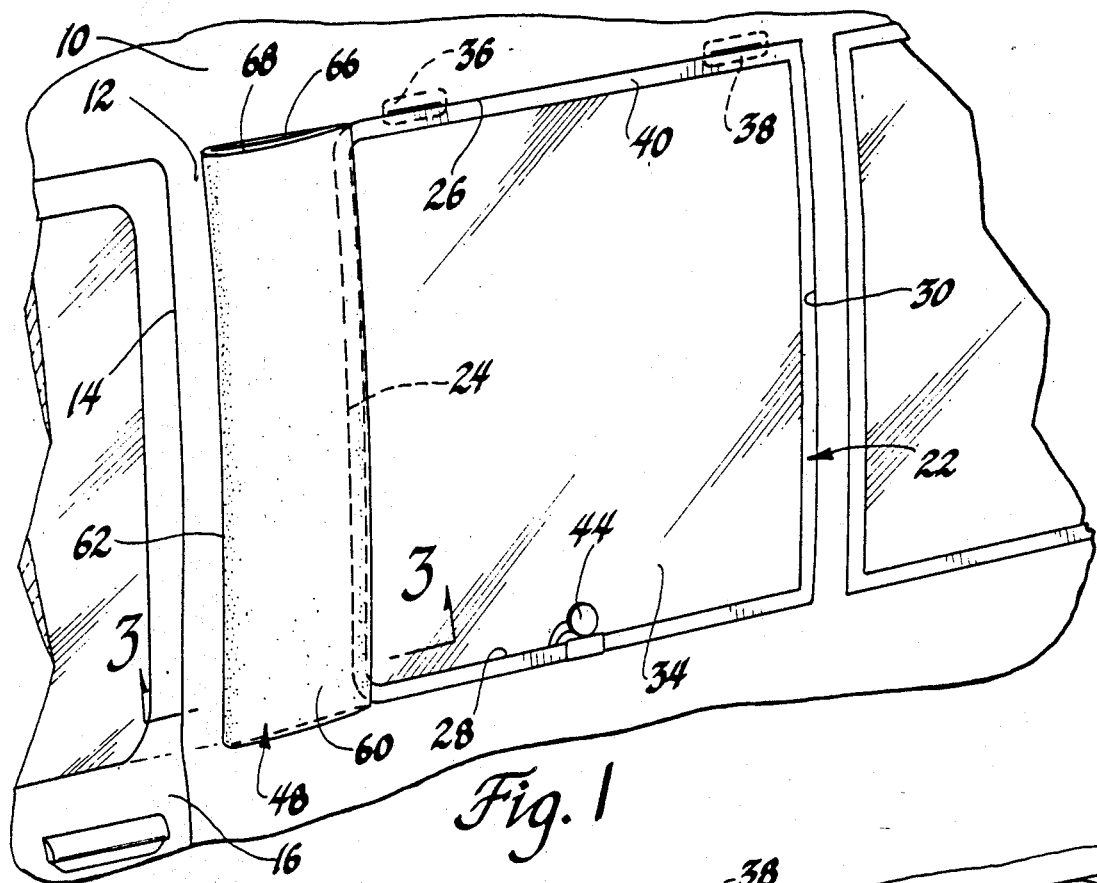
FIG. 1 is a side elevation view of a vehicle body van window having the wind deflector of this invention and shown in the window closed position.

Referring to FIG. 1, the vehicle body 10 is defined by one or more sheet metal panels suitably welded together to provide a pillar 12 defining a front door opening 14 which is open and closed by a door 16. As best seen in FIG. 3, the pillar 12 is comprised of welded together outer panel 18 and inner panel 20. Rearwardly of the door 16 the vehicle side wall has a rectangular window opening 22 as defined by a forward edge 24, top edge 26 and a bottom edge 28, and a rearward edge 30. A window pane 34 is mounted in the window opening 22 by a pair of hinges 36 and 38. The window pane 34 is surrounded by a U-shaped channel which defines a frame 40 on the window pane 34. The hinges 36 and 38 act between this U-shaped channel and the body panel defining the top edge 26 of the window opening 22. A toggle linkage 44 acts between the body panel defining the bottom edge 28 of the window opening 22 and the window frame 40 at the bottom edge of the window pane 34 to move the window pane 34 between a normal closed position of FIG. 1 and a swung-out open position of FIG. 2. In the FIG. 1 closed position, the window pane 34 is flush with the side wall of the vehicle body. In the open position of FIG. 2, the bottom edge of the window pane 34 is swung outwardly so that a gap develops between the leading edge of the window pane 34 and the pillar 12.

A wind deflector for closing the gap between the leading edge of the window pane 34 and the pillar 12 includes an inner panel 46 and an outer panel 48 which overlie one another. These deflector panels 46 and 48 are generally rectangular in shape, have a length which is equal to the height of the window pane 34, and are constructed of a transparent plastic. As best seen in FIG. 3, the inner panel 46 has a mounting portion 50 which is suitably attached to the window frame 40 at the leading edge of the window pane 34, and a deflecting portion 52 which extends forwardly from the mounting portion 50. The mounting portion 50 and the deflecting portion 52 of the inner panel 46 are integrally connected by a plastic living hinge 54 which normally biases the deflecting portion 52 inwardly toward the vehicle body to the position of FIG. 3. The outer deflecting panel 48 includes a mounting portion 58 which is suitably attached, by screws or adhesive, to the pillar 12 along a vertical line forwardly of the window opening 22 and a deflecting portion 60 which extends rearwardly therefrom to overlie the inner panel 46. The mounting portion 58 and the deflecting portion 60 of the outer panel 48 are integrally connected by a living hinge 62 which functions to bias the panel 48 to the normal position of FIG. 3.

Figure 2:
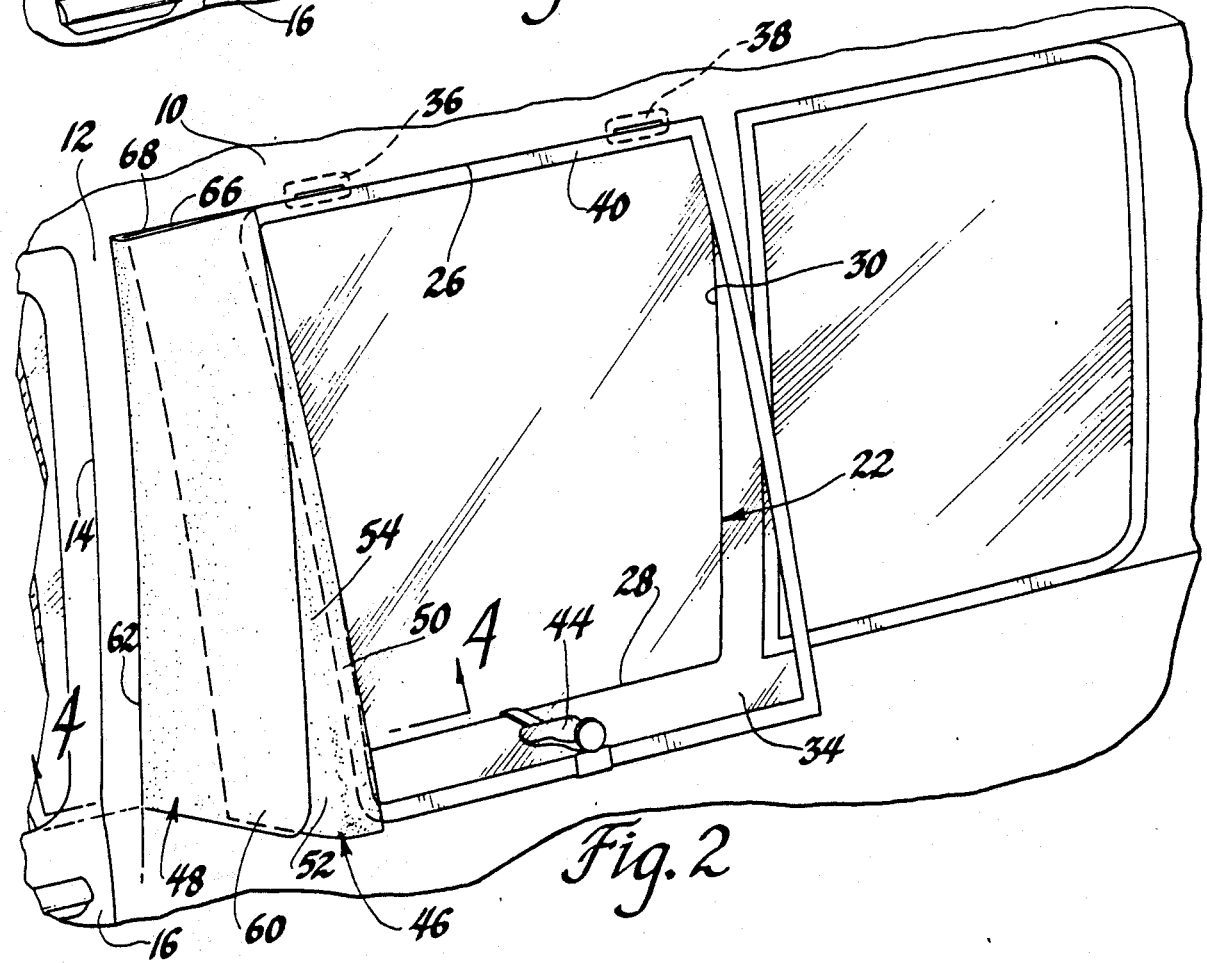
FIG. 2 is a view similar to FIG. 1 but showing the window pushed open and the wind deflector deployed to the wind deflecting position.
Figure 3:
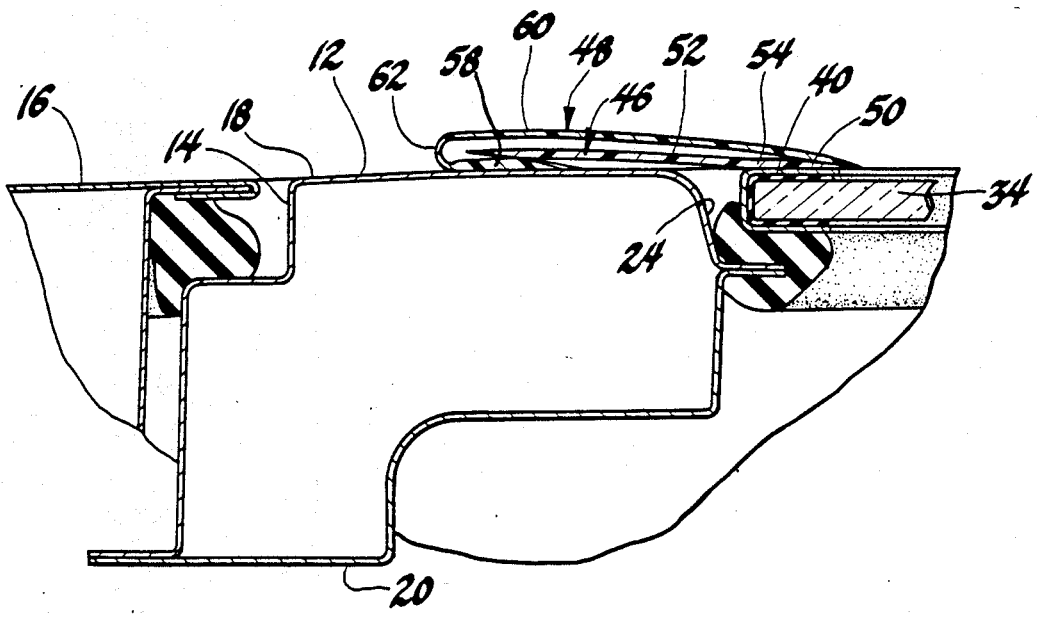
FIG. 3 is a sectional view taken in the direction of arrows 3—3 of FIG. 1.
Figure 4:
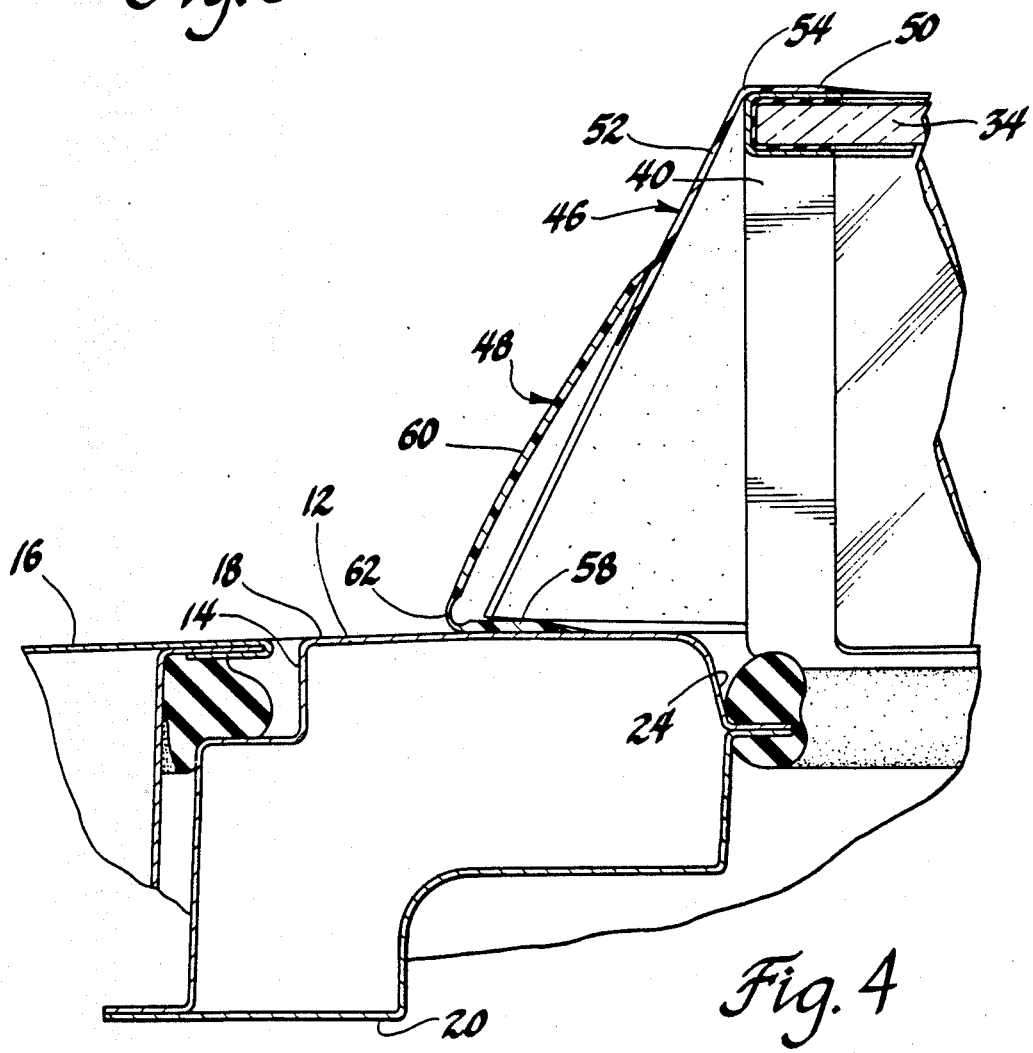
FIG. 4 is a sectional view taken in the direction of arrows 4—4 of FIG. 2.

Referring to FIGS. 2 and 4, it is seen that the outward swinging movement of the bottom of the window pane 34 to the open position will automatically deploy the deflector panels 46 and 48 into a wind deflecting position in which the panels cooperate to fill the gap between the body panel 12 and the leading edge of the window pane 34.

As best seen in FIG. 4, the inner deflector panel 46 is bodily shifted outwardly with the outward swinging movement of the window pane 34 as viewed in FIG. 3. It will be appreciated that the plastic living hinge 54 of the inner panel 46 is attempting to urge the deflecting portion 52 into a straight line relationship with the mounting portion 50. However, at the same time, the plastic living hinge 62 is urging the deflecting portion 60 of the outer panel 48 back toward its normal position overlying the pillar 12. Accordingly, it will be understood that the deflector panels 46 and 48 are in a sense fighting against each other with the result that the panels 46 and 48 remain in the extended straight line relationship shown in FIGS. 2 and 4 and thereby cooperate to close the gap between the pillar 12 and the leading edge of the window pane 34 in a manner which will deflect the oncoming airflow past the window and thereby limit the noise level in the passenger compartment.

Referring to FIG. 2, it will be appreciated that the top margins 66 of the inner panel 46 and 68 of the outer panel 48 move very little relative one another during the outward swinging movement of the window pane 34, while the bottom edges of the inner and outer panels 46 and 48 move substantially relative one another. Accordingly, it is possible for the upper edge portions 66 and 68 to be attached to one another or to the vehicle body. Such attachment of the upper top margins 66 and 68 will assist the living hinges 54 and 62 in restoring the panels 46 and 48 to their normal overlying relationship of FIG. 3 when the toggle linkage 44 returns the window pane 34 to its normal closed position of FIG. 1.

Thus, it is seen that the invention provides a new and improved wind deflector for van windows of the swing-out type.

The embodiments of the invention in which an exclusive property or privilege is claimed are defined as follows:

1. A wind deflector for a vehicle window of the type having a window pane top edge hingedly mounted at the top of the window opening and a toggle mechanism acting between the bottom edge of the window pane and the bottom of the window opening so that the window pane is movable between a normal closed position generally flush with the vehicle body and an open position in which the bottom edge is swung outwardly away from the vehicle so that the leading edge of the window pane is spaced away from the forward edge of the window opening by a gap which is progressively wider from the top to the bottom, said wind deflector comprising:

first and second generally rectangular deflector panels of yieldable material overlying one another with the inner panel attached to the leading edge of the window pane and extending forwardly therefrom and the outer panel attached to the vehicle body along a generally vertical line forward of the forward edge of the window opening and extending rearwardly therefrom, said panels overlying one another in close spaced streamlining relation with the vehicle body when the window is closed and causing one another to yield upon opening movement of the window so that the panels overlie one another and bridge the gap between the leading edge of the window pane and the vehicle body to streamline and deflect the oncoming airflow.

2. A wind deflector for a vehicle window of the type having a window pane top edge hingedly mounted at the top of the window opening and a toggle mechanism acting between the bottom edge of the window pane and the bottom of the window opening so that the window pane is movable between a normal closed position generally flush with the vehicle body and an open position in which the bottom edge is swung outwardly away from the vehicle so that the leading edge of the window pane is spaced away from the forward edge of the window opening by a gap which is progressively wider from the top to the bottom, said wind deflector comprising:

a first rectangular deflector panel of yieldable material attached to the leading edge of the window pane and extending forwardly therefrom;

a second rectangular deflector panel attached to the vehicle body along a generally vertical line forward of the forward edge of the window opening and extending rearwardly therefrom and overlying the first rectangular deflector panel, said first and second deflector panels having top edges suitably attached to maintain said panels overlying one another in close spaced streamlining relation with the vehicle body when the window is closed;

said first and second deflector panels yielding and causing one another to yield upon opening movement of the window so that the panels overlie one another and extend relative one another by an extent which is progressively greater from the top to the bottom of the panels to bridge the gap between the leading edge of the window pane and the vehicle body to streamline and deflect the oncoming airflow.

3. A wind deflector for a vehicle window of the type having a window pane top edge hingedly mounted at the top of the window opening and a toggle mechanism acting between the bottom edge of the window pane and the bottom of the window opening so that the window pane is movable between a normal closed position generally flush with the vehicle body panel and an open position in which the bottom edge is swung outwardly away from the vehicle so that the leading edge of the window pane is spaced away from the forward edge of the window opening by a gap which is progressively wider from the top to the bottom, said wind deflector comprising:

a first rectangular deflector panel of yieldable material having a mounting portion attached to the leading edge of the window pane, a deflecting portion extending forwardly therefrom, and a plastic living hinge integrally connecting the deflecting portion to the mounting portion and urging the deflecting portion to closely overlie the vehicle body panel;

a second rectangular deflector panel of yieldable material having a mounting portion attached to the vehicle body along a generally vertical line forward of the forward edge of the window opening, a deflecting position extending rearwardly therefrom and overlying the first deflector panel, and a plastic living hinge integrally connecting the deflecting portion to the mounting portion and urging the deflecting portion to closely overlie the first deflector panel;

said first and second deflector panels yielding and causing one another to yield upon opening movement of the window so that the panels overlying one another extend relative one another by an extent which is progressively greater from the top to the bottom of the panels to bridge the gap between the leading edge of the window pane and the vehicle body to streamline and deflect the oncoming airflow.

* * * * *